(12) United States Patent
Nakamura et al.

(10) Patent No.: US 6,527,484 B2
(45) Date of Patent: Mar. 4, 2003

(54) HELICAL TOOTH BROACH

(75) Inventors: Kazuyuki Nakamura, Chiryuu (JP);
Yasushi Nogawa, Toyama (JP);
Hidetaka Nakae, Anjyou (JP);
Katsuhiko Nishimura, Anjyou (JP)

(73) Assignees: Nachi-Fujikoshi Corp., Toyama (JP);
Aisin AW Co., Ltd., Anjyou (JP)

( * ) Notice: Subject to any disclaimer, the term of this patent is extended or adjusted under 35 U.S.C. 154(b) by 0 days.

(21) Appl. No.: 09/901,673

(22) Filed: Jul. 11, 2001

(65) Prior Publication Data

US 2002/0015622 A1 Feb. 7, 2002

(30) Foreign Application Priority Data

Jul. 21, 2000 (JP) ........................................ 2000-220239

(51) Int. Cl.[7] ................................................ B23P 15/42
(52) U.S. Cl. ............................. 407/13; 407/18; 407/19; 407/16; 407/17
(58) Field of Search ............................. 407/13, 14, 15, 407/16, 17, 18, 19, 12, 20, 21; 409/139, 140, 297

(56) References Cited

U.S. PATENT DOCUMENTS

| | | | | |
|---|---|---|---|---|
| 1,339,657 A | * | 5/1920 | Lapointe | |
| 2,011,630 A | * | 8/1935 | Halborg | |
| 2,060,889 A | * | 11/1936 | Nilsson | |
| 2,683,919 A | * | 7/1954 | Psenka | |
| 2,986,801 A | | 6/1961 | Mentley | |
| 3,267,552 A | * | 8/1966 | Psenka | |
| 3,439,398 A | * | 4/1969 | Zawacki et al. | |
| 3,795,958 A | * | 3/1974 | Psenka | |
| 4,274,767 A | * | 6/1981 | Bistrick et al. | |

FOREIGN PATENT DOCUMENTS

| | | | |
|---|---|---|---|
| JP | 63185515 A | * | 8/1988 |
| JP | 01-271119 | | 10/1989 |
| JP | 02-105915 | | 1/1990 |
| JP | 8-8019 | | 6/1996 |
| JP | 10-309622 | | 11/1998 |
| JP | 2000-94215 A | * | 4/2000 |

OTHER PUBLICATIONS

JIS Japanese Industrial Standard, JIS B 0175, 1996, Broaches—Vocabulary, p. 10.

* cited by examiner

Primary Examiner—Derris H. Banks
Assistant Examiner—Ali Abdelwahed
(74) Attorney, Agent, or Firm—Venable; Robert J. Frank

(57) ABSTRACT

A helical gear tooth broach having an elongate body having a series of axially aligned and spaced teeth disposed thereon. The direction of tooth spaces or traces of the teeth in a longitudinally extending helical alignment and the direction of the gullets of the teeth in a side by side circumferentially extending helical arrangement are both oriented at a right-upward or a left-upward helix angle in common with each other.

8 Claims, 5 Drawing Sheets

PRIOR ART

HELICAL TOOTH BROACH

BACKGROUND OF THE INVENTION

1. Field of the Invention

The present invention relates to a gear tooth broach for forming internal helical gears or splines.

2. Description of the Related Art

Internal helical gears or splines widely used in transmissions for motor cars are machined by using helical gear tooth broaches each having a series of axially aligned and spaced teeth disposed thereon, tooth spaces or traces of the teeth in a longitudinally extending helical alignment along the axis of the body at a helical angle the same as that of the internal helical gear or spline to be machined and gullets of the teeth in a general side by side circumferentially extending helical arrangement.

Generally, the helical gear tooth broach has an elongate body having a roughing broach section disposed thereon having a series of teeth having substantially the same width and increasing height to perform deep cuts for the tooth spaces and a finishing broach section formed on a shell integrated with the elongate body and having a series of teeth having substantially full height and increasing width to perform finish cuts of the sides of each tooth of a work piece.

A helical gear tooth broach, such as shown in Japanese Industrial Standard (J IS) B 0175 No. 1622, is of the so called right-angled-to-the-axis gullet broach, wherein each tooth space or trace of the teeth is formed so that it longitudinally extends at a helical angle which is the same as that of the internal helical gear or work to be machined, and each gullet of the teeth in a general side by side circumferentially extending helical arrangement is made to form an annular groove. Such a right-angled-to-the-axis gullet broach performs an intermittent cutting action against a horizontal plane of the work to be machined, and generates vibrations and deteriorates machining accuracy.

Further, as shown in FIG. 4 of U.S. Pat. No. 2,986,801, a helical gear tooth broach is known which has a series of axially helically aligned and spaced thread-like teeth along the axis of the broach body and gullets of the teeth each of which extends at a helical angle perpendicular to the helix angle of a tooth space or trace. More precisely, in FIG. 4 of U.S. Pat. No. 2,986,801, the direction of the arrow 7 of a tooth space or trace crosses at a right angle to the direction of the arrow 6 of a gullet. This type of broach is called right-angled-to-the-tooth-trace gullet broach.

Furthermore, Japanese Unexamined Patent Publication (TOKKAI) Hei 2(1990)-15915 and TOKKAI Hei 1(1989)-271119 both disclose helical gear tooth broaches having gullets each of which extends at a helical angle not perpendicular to the helix angle of a tooth space or trace. Also, in Japanese Examined Utility Model Publication Hei 8(1996)-8019 and TOKKAI Hei 10(1998)-309622, helical tooth broaches are disclosed in which the number of each of its helical-splined gullet(s) is changed.

However, in the above described conventional helical gear tooth broaches, as shown in FIG. 4, in which a portion of the surface of the conventional broach is projected on a plane, the direction of the tooth spaces or traces 14 of teeth 12 in the longitudinally extending helical alignment and the direction of the gullets 13 in the general side by side circumferentially extending helical arrangement are reversely oriented with respect to each other. That is, the tooth spaces or traces 14 of teeth 12 orient to a right hand of a helix angle (right-upward oriented) and on the contrary, the gullets 13 are directed to a left hand of a helix angle (left-upward oriented). Stated another way, the teeth 12 and tooth spaces 14 are oriented in FIG. 4 along a line 14' on the projection of the broach surface having a positive slope whereas the gullets 13 are oriented along a line having an opposite or negative slope. That is, the signs of the slopes of the lines defining the orientation of the teeth 12 and gullets 13 are opposite to each other in the conventional broach of FIG. 4.

Setting the helix angle $\beta$ of a tooth space or trace 14 of the teeth 12 to be equal to that of the work to be broached, and assuming that the helix angle of a gullet 13 is $(90°-\alpha')$, by selecting the helix angles $\beta$, $\alpha'$ and the number of helically splined gullets) the cutting dimension of the broach is determined. In the above described right-angled-to-the-axis gullet broach, the angle $\alpha'$ is set equal to 0 ($\alpha'=0$), and in the above described right-angled-to-the-tooth-trace gullet broach, $\alpha'=\beta$. Further, the helix angle $\beta$ of the tooth space or trace 14 is called "a helix angle to the axis of the broach", and the helix angle $(90°-\alpha')$ of the gullet 13 is called "a helix angle to the circumferential direction of the gullet 13".

When an internal helical gear or a work is broached using a helical gear tooth broach, a twisting movement is applied to the work along the direction of the helix angle $\beta$ of the tooth spaces or traces 14 of the broach. As a result, the work to be broached is rotated in a direction in which the twisting movement is applied to the broach.

In such a situation, in the above described conventional helical gear tooth broach having the conventional helical gullet, such as shown in FIG. 4, a component of the force generated by the cutting resistance force of the teeth of the broach in an axial direction along an axis 5 presses the work to be broached in the circumferential direction and in addition, causes the work to rotate to a greater or lesser extent. To cope with this component of the force, the work to be broached should be strongly clamped to limit its rotating movement.

On the other hand, in the above described right-angled-to-the-axis gullet broach, since the angle $\alpha'=0$, no axial component of the force is generated by the cutting resistance force of the teeth and no circumferential additional rotational force is applied to the work to be broached. However, such broach performs an intermittent cutting action against the work and deteriorates machining accuracy compared with the above described right-angled-to-the-tooth-trace gullet broach.

Therefore, in the above described conventional helical gear tooth broaches, in order to limit the rotating movement of the work to be broached, a strong clamp on the work is required. On the contrary, in the above described right-angled-to-the-axis gullet broach, although no axial component of the force is applied, the cutting action against the work is intermittent, and the accuracy of machining is not sufficient.

SUMMARY OF THE INVENTION

It is an object of this invention to provide a helical gear tooth broach which does not require strong clamping of the work to be broached by a special clamping device, and which does not perform an intermittent cutting action against the work.

These and other objects of the present invention are solved by a gear tooth broach for broaching internal helical gears or splines comprising an elongate body having a series of axially aligned and spaced teeth disposed thereon, tooth spaces or traces of the teeth in a longitudinally extending helical alignment along an axis of the body and gullets of the teeth in a side by side circumferentially extending helical arrangement. The gear tooth broach is characterized in that a first direction of the tooth spaces or traces of the teeth in the longitudinally extending helical alignment and a second direction of the gullets of the teeth in the side by side circumferentially extending helical arrangement are both oriented at a right-upward or left-upward helix angle in common with each other.

In the above described conventional helical gear tooth broaches, as shown in FIG. 4, the direction of the tooth spaces or traces in the longitudinally extending helical alignment and the direction of the gullets in the side by side circumferentially extending helical arrangement are reversely oriented with respect to each other. Thus, the rotational force applied to the work generated by the component of the force generated by the cutting resistance force of the teeth of the broach in a circumferential direction and the rotational force generated by the pulling force applied to the broach along the tooth spaces act in the same rotational direction and increase the rotational force applied to the work.

On the contrary, according to this invention, since the direction of the tooth spaces or traces in the longitudinally extending helical alignment and the direction of the gullets in the side by side circumferentially extending helical arrangement are both oriented at a right-upward or left-upward helix angle in common with each other, the rotational force applied to the work by the twisting movement along the direction of the tooth spaces or traces, and the rotational force applied to the work generated by the component of the force of the cutting resistance force of the teeth by the pulling force applied to the broach, act in the reverse rotational direction with respect to each other, thereby decreasing the rotational force applied to the work. That is, a component of the force generated by the cutting resistance force has the effect of preventing the rotational movement of the work by the twisting movement along the direction of the tooth spaces or traces, and stable cutting of the broach is achieved. Thus, the helical gear tooth broach according to the present invention does not require strong clamping of the work to be broached by the special clamping device. Further, because the gullets are helically arranged in contrast to the above right-angled-to-the-axis gullet broach, no intermittent cutting action against the work is performed.

Preferably, assuming that a helix angle of the direction of a tooth space is $\beta$ and the helix angle of a gullet is $(90°-\alpha)$, the angle $\alpha$ is determined to be in the range $0°<\alpha \leq \beta+5°$.

The reason the angle a of the helix angle $(90°-\alpha)$ of the gullet is determined to be in the range equal to or less than $(\beta+5°)$ is that if the angle $\alpha$ is above $(\beta+5°)$, the sharpness of the teeth is dulled, and the surface roughness is deteriorated resulting in a short life thereof. Preferably, the angle a is made equal to the angle $\beta$, so that $\alpha=\beta$.

DETAILED DESCRIPTION OF THE PREFERRED EMBODIMENT

While the present invention is applicable to the cutting of internal gears or splines by means of a broach or to the broaching of external gears or splines by a pot broach, and while it is applicable to a solid broach having both a roughing section and a finishing section or a broach having a finishing section on a shell provided at the trailing end of a roughing section of an elongate body, it may be assumed in the following description that a preferred embodiment of the present invention will be given with reference to the cutting of internal gears by means of a solid broach having both a roughing section and a finishing section shown in FIGS. 1–3.

Figure 1:
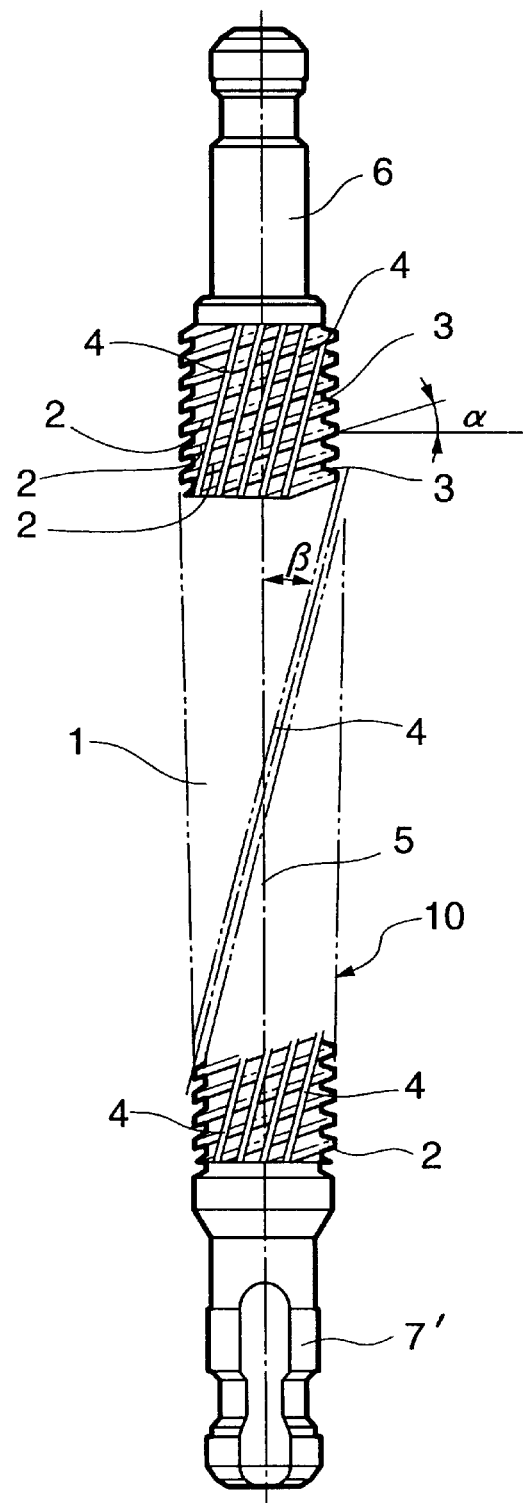
FIG. 1 is a general elevational front view of a gear tooth broach according to a preferred embodiment of the present invention in which the direction of a tooth space or trace and the direction of a gullet are both oriented at a right-upward helix angle in common with each other.

FIG. 1 is a general elevational front view of a gear tooth broach 10 according to the preferred embodiment of the present invention in which a direction of a tooth space or trace and a direction of a gullet are both oriented at right-upward helix angles in common with each other. In FIG. 1, the gear tooth broach 10 for broaching of internal helical tooth traces of internal helical gears not shown, comprises an elongate body 1 having a series of axially aligned and spaced teeth 2 disposed thereon along an axis 5 of the body 1, tooth spaces 4 longitudinally extending at a helical angle $\beta$ which is the same angle as that of the internal helical gears to be machined, and side by side gullets 3 circumferentially extending at a helix angle a to a plane perpendicular to the axis 5.

The direction of the longitudinally helically extending teeth 2 and tooth spaces 4 is oriented at a right-upward helix angle. The side by side circumferential helically extending gullets 3 are also oriented at a right-upward helix angle. The broach 10 is pulled downwardly, as seen in FIG. 1, by a pulling device (not shown). Formed on the solid elongate body 1 in series from the lower portion are a roughing broach section having a series of teeth 2 of substantially the same width and of increasing height to perform deep cutting of the tooth spaces of the work, a semi-finishing broach section and a finishing broach section both having a series of teeth 2 of substantially full height and of increasing width to perform side cutting of the tooth spaces of the work. The broach 10 has a pull end 7' at its lowermost end, and a follower end 6 at its uppermost end, as seen in FIG. 1. The broach 10 may have all these broach sections on the solid elongate body 1 or may have one of them thereon. Further, the finishing section may be formed on the solid elongate body 1 or on a detachable shell (not shown) provided at the trailing end of the roughing section formed on the solid elongate body 1.

Figure 2:
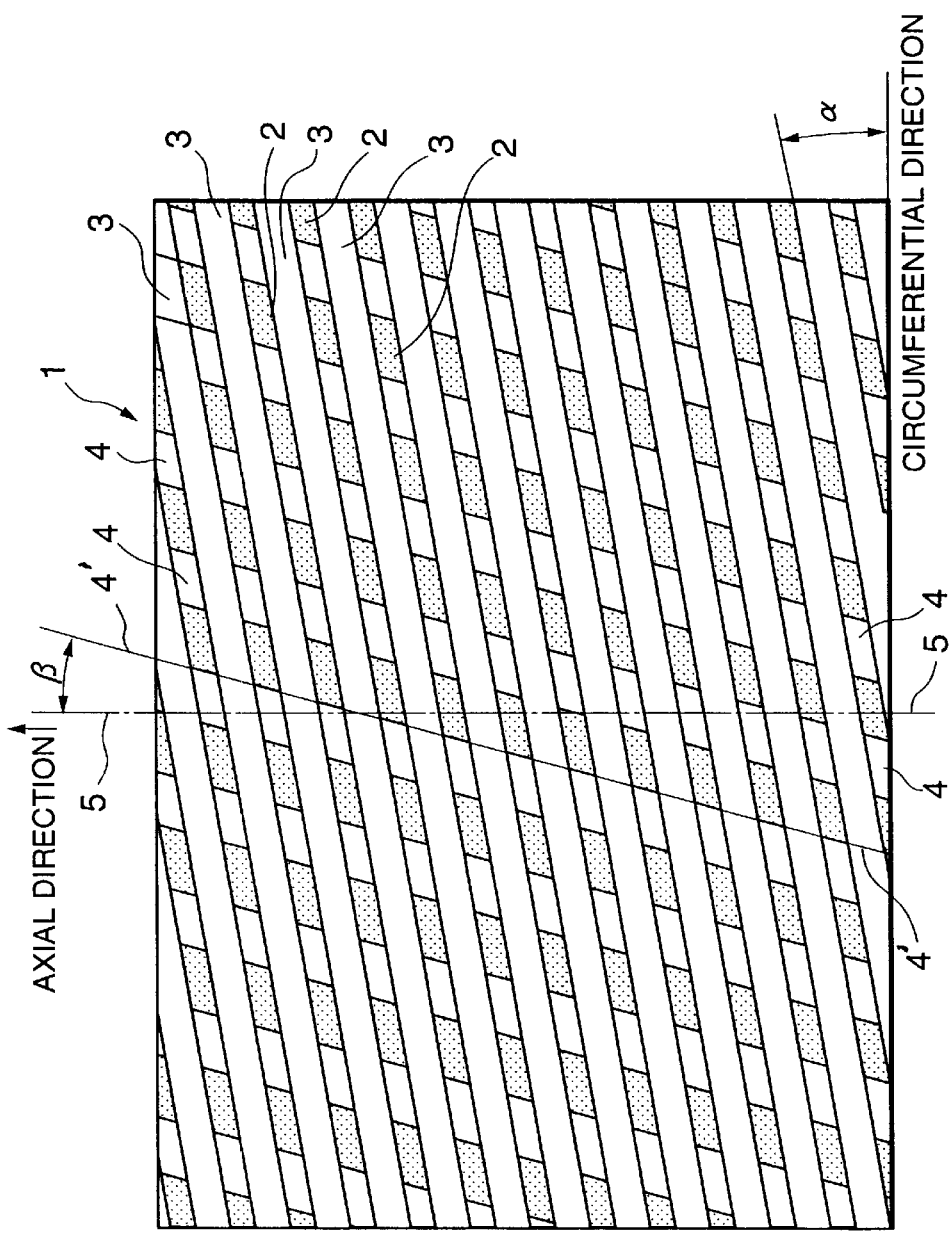
FIG. 2 is a development view of a plane surface of a portion of the broach shown in FIG. 1 showing a series of axially aligned and spaced teeth disposed on the broach having both tooth spaces and gullets.

Reference is made to FIG. 2 showing a development elevational view of a plane surface of a portion of the broach shown in FIG. 1. FIG. 2 shows a series of axially aligned and spaced teeth 2 disposed on the elongate body 1 of the broach 10 having both tooth spaces or traces 4 and gullets 3. The tooth spaces or traces 4 longitudinally extend at a helical angle β to the axis 5 of the broach 10. Side by side gullets 3 circumferentially extend at a helix angle α to a plane perpendicular to the axis 5, the helix angle of the gullets 3 relative to the axis 5 being (90−α). That is, gullets 3 extend in a right-upward direction at a helix angle 90−α with respect to the axis 5. Stated another way, the teeth 2 and tooth spaces 4 are oriented in FIG. 2 along a line 4' on a planar projection of the broach surface having a positive slope, and the gullets 3 are also oriented along a line having a positive slope. That is the signs of the slopes of the teeth 2 and gullets 3 are the same. However, as can be seen from FIG. 2, the magnitudes of the slopes are different.

The cutting or broaching of an internal gear or work by means of the broach 10 is performed by pulling the broach 10 downwardly as seen in FIG. 1 by the pulling device, and the broach 10 is simultaneously rotated so that the direction of tooth spaces or traces 4 of the broach 10 coincides with the longitudinal helical angle of the tooth spaces or traces of the internal gear or work to be broached.

Figure 3:
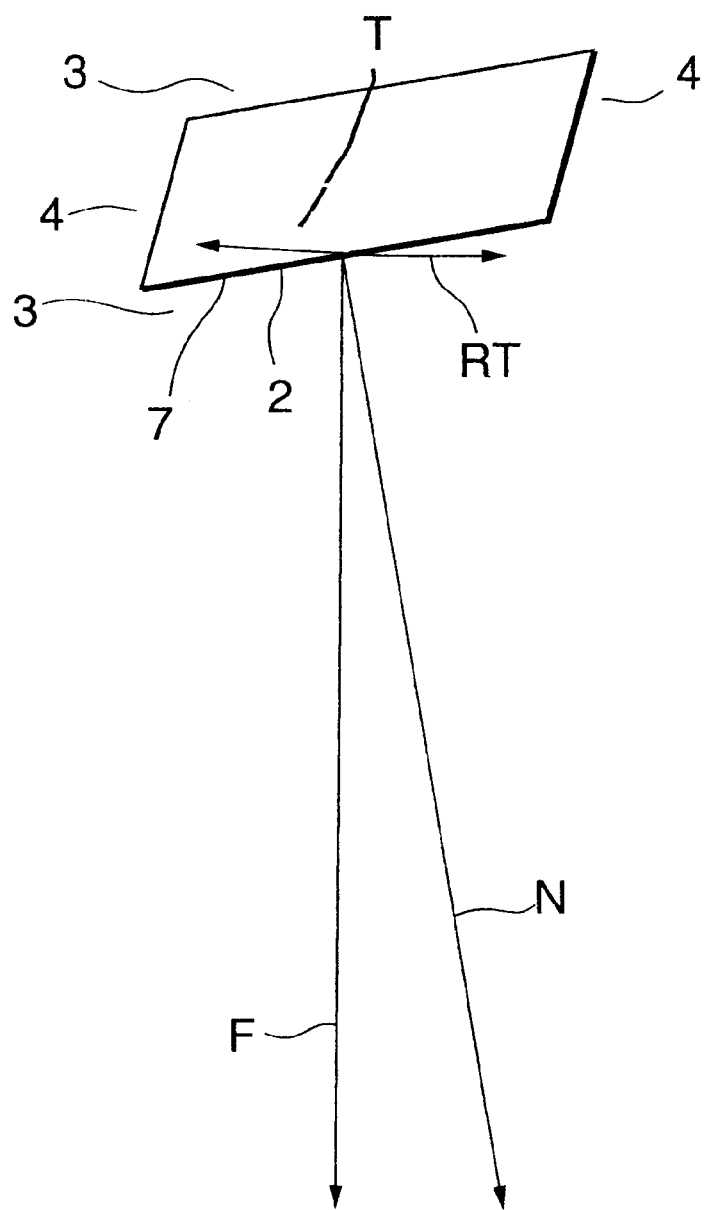
FIG. 3 is an enlarged view of one of the teeth of the gear tooth broach shown in FIG. 2 together with a diagrammatic representation of the cutting force N, components both of the cutting force N in an axial direction F and in a circumferential direction RT, all applied to the work to be broached by a tooth edge of a tooth.

As seen in FIG. 3, the broach 10 applies to the internal gear or work, according to the present invention, a twisting rotational force T and a downward pulling force F. However, since the direction of a leading tooth cutting edge 7 of the tooth 2 along the gullet 3 is oriented at a right-upward direction at the helix angle α, a cutting force component N is applied to the work in a direction normal to the leading tooth cutting edge. The pulling force F acts in an axial direction and a rotational force component RT acts in a rightward or circumferential direction, as seen in FIG. 3.

Consequently, the twisting rotational force T applied to the work by the broach 10 is in opposition to the counter rotational force RT applied to the work. Thus, the twisting rotational force applied to the work by the broach 10 is decreased by the counter rotational force RT by an amount equal to (T−RT), thereby reducing the clamping force to be applied to the work.

Figure 4:
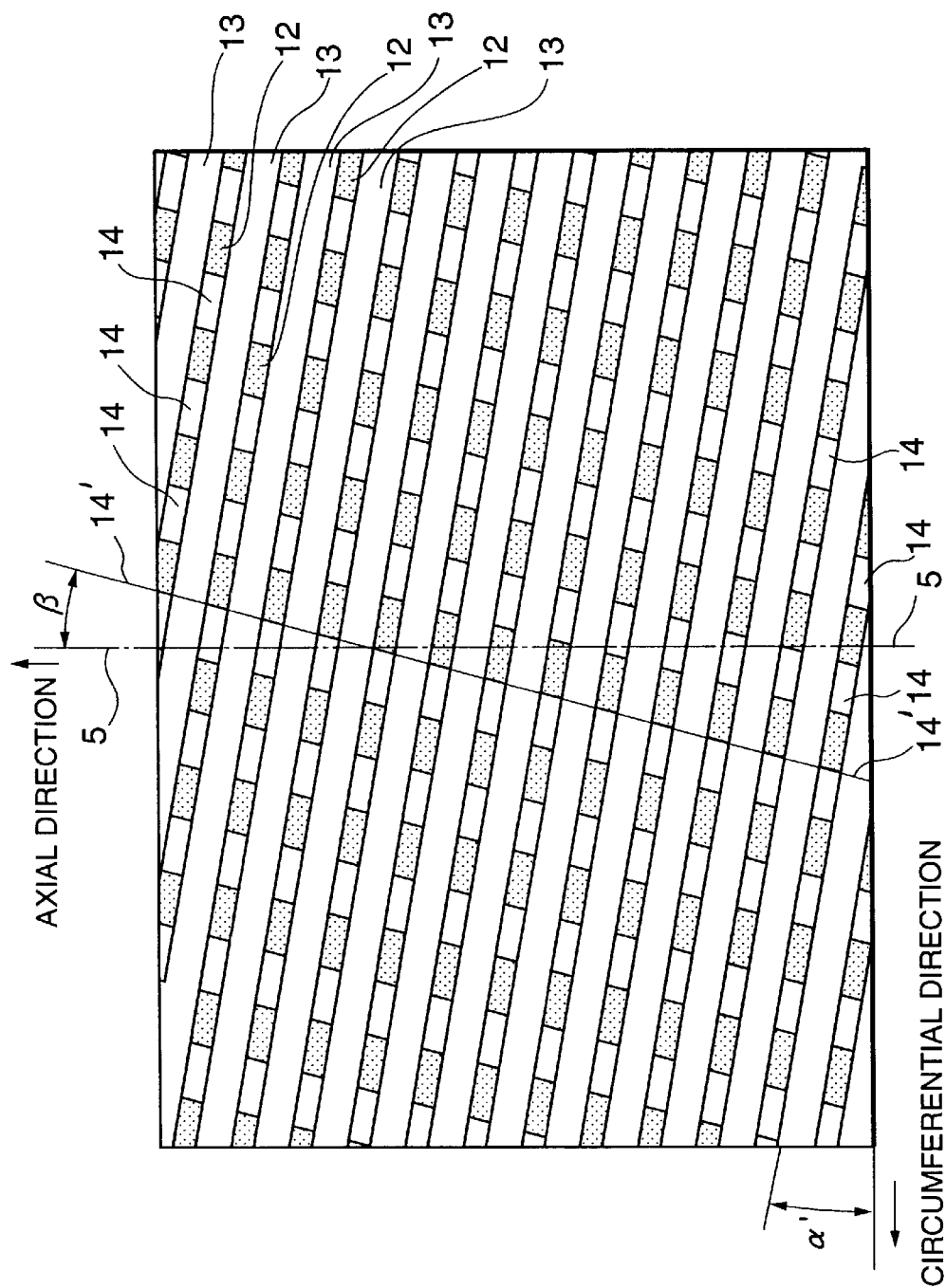
FIG. 4 is a development view of a plane surface similar to FIG. 2 of a portion of a conventional broach showing a series of axially aligned and spaced teeth disposed on the broach having both tooth spaces or traces in a longitudinally extending helical alignment at a right-upward helix angle and gullets in a side by side circumferentially extending helical arrangement at a left-upward helix angle.
Figure 5:
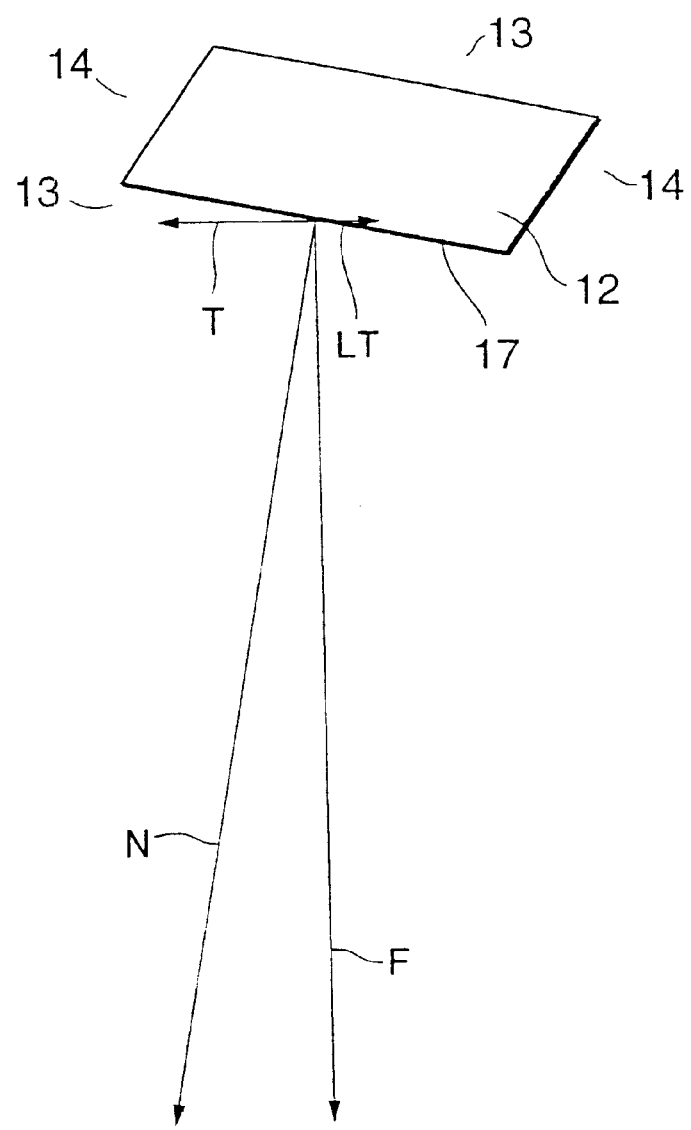
FIG. 5 is an enlarged view of one of the teeth of the gear tooth broach shown in FIG. 4 together with a diagrammatic representation of the cutting force N, components both of the cutting force N in an axial direction F and in a circumferential direction LT all applied to the work to be broached by a tooth edge of a tooth.

In contrast, in the above described conventional helical gear tooth broach shown in FIG. 4, the direction of the longitudinally extending helical tooth spaces or traces 14 and the direction of the side by side circumferentially extending helical gullets 13 are revesely oriented with respect to each other. Referring to FIG. 5 showing a tooth 12 of the prior art broach of FIG. 4, it is seen that the leading cutting edge 17 of the tooth 12 along a gullet 13 is oriented in the left-upward direction. Accordingly, assuming a counter rotational force LT is applied to the work, the twisting rotational force applied to the work by the broach 10 will be (T−LT). Thus, the decrease of the twisting rotational force applied to the work is computed by the following formula; (T−LT)−(T−RT)=(RT−LT). The amount of decrease (RT−LT) is very large. Occasionally, the number of helically splined gullet(s) of a broach is selected in the range three (3) to five (5), and in this embodiment, the number of helically splined gullets is three (3).

In short, in the gear tooth broach according to the present invention, the direction of the tooth spaces or traces in the longitudinally extending helical alignment and the direction of the gullets in the general side by side circumferentially extending helical arrangement are both oriented in either a right-upward or a left-upward direction. As a result, the twisting rotational force applied to the work generated by the cutting resistance force of the teeth of the broach actively functions to reduce the twisting rotational force applied to the work. Thus, the clamping force that must be applied to the work is reduced, and strong clamping by a special clamping device is not required.

Generally, a work support jig of a broaching machine on which a work is placed is equipped with a special clamping device. One such device is the so called "spikes", a device having a lot of needle-like spikes, like a pinholder, and broaching is performed by placing the work on the "spikes" set on the work support jig. However, in the above embodiment, since the twisting rotational force by the component applied to the work by the broach may be lessened to a degree that the frictional force between the work and the work support jig provides the necessary clamping force, the work can be broached without using a special clamping device such as the so called "spikes".

Further, since the direction of the tooth spaces in the longitudinally extending helical alignment and the direction of the gullets in the side by side circumferentially continuously extending helical spline at an angle of (90°−α) are both oriented at right-upward or left-upward helix angles, a very stable cut may be performed with high machining accuracy. Preferably, assuming that the helix angle of the direction of a tooth space is β and the helix angle of a gullet is (90°−α), the angle α is determined to be in the range $0°<α≦β+5°$, thereby lowering or dulling of the sharpness of the broach teeth is prevented.

Further, in the broaching of the broach according to the present invention, each tooth continuously performs the same cutting action with the same cutting condition as the other teeth. Therefore, no intermittent cutting action is performed against the work, in contrast to the right-angled-to-the-axis gullet broach, thereby reducing heat generation and increasing the accuracy with which tooth profiles and tooth spaces are produced. Further, since no intermittent cutting action is performed, service life is longer than that of the right-angled-to-the-axis gullet broach.

What is claimed is:

1. A gear tooth broach for broaching internal helical gears or splines comprising an elongate body having a series of axially aligned and spaced teeth disposed thereon, tooth spaces or traces of the teeth longitudinally extending in a helical alignment along an axis of the body and gullets of the teeth circumferentially extending in a parallel helical arrangement, wherein a first direction of the tooth spaces or traces of the teeth longitudinally extending in the helical alignment and a second direction of the gullets of the teeth circumferentially extending in the parallel helical arrangement are both oriented at right-upward or left-upward helix angles in common with each other.

2. A broach as defined in claim 1, in which said first direction of the tooth spaces or traces is oriented at a first helix angle β with respect to the axis, and the second direction of the gullets is oriented at a second helix angle (90°−α), the angle α being in a range $0°<α≦β+5°$.

3. A gear tooth broach for broaching internal helical gears or splines, comprising:

an elongated cylindrical body having a surface and a longitudinal axis;

a plurality of spaced parallel rows of teeth extending helically along the surface of said cylindrical body at a helix angle β with respect to said longitudinal axis; and a plurality of parallel gullets extending helically along the surface of said cylindrical body at a helix angle (90°−α)

with respect to said longitudinal axis, each of said gullets being interposed between a row of said helical teeth, where a is the helix angle of said gullets with respect to a plane extending in a circumferential direction perpendicular to said longitudinal axis, said rows of teeth having slopes and said gullets having slopes, wherein the slopes of said rows of teeth and the slopes of said gullets have an identical sign, either positive or negative.

4. The gear tooth broach defined by claim 3 wherein $\alpha$ is in a range $0° < \alpha \leq \beta + 5°$.

5. The gear tooth broach defined by claim 3 wherein the rows of teeth extending helically along said cylindrical body include at least one of:

a roughing broach section for performing deep cutting of tooth spaces of a work, said roughing broach section having a series of teeth of substantially the same width and increasing height;

a semi-finishing broach section; and a finishing broach section, said semi-finishing broach section and said finishing broach section performing cutting of tooth spaces of the work, and having series of teeth of substantially full height and increasing width.

6. The gear tooth broach defined by claim 5 wherein said cylindrical body has a pull end for attachment to a pulling device and a follower end, and wherein said roughing broach section is adjacent the pull end of said cylindrical body, said finishing broach section is adjacent the follower end of said cylindrical body, and said semi-finishing broach section is interposed between said roughing and finishing broach sections of said cylindrical body.

7. The gear tooth broach defined by claim 5 wherein $\alpha$ is in a range $0° < \alpha \leq \beta + 5°$.

8. The gear tooth broach defined by claim 6 wherein $\alpha$ is in a range $0° < \alpha \leq \beta + 5°$.

* * * * *

UNITED STATES PATENT AND TRADEMARK OFFICE
Certificate

Patent No. 6,527,484 B2                                                           Patented: March 4, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kazuyuki Nakamura, Chiryuu, (JP); Yasushi Nogawa, Toyama, (JP); Hidetaka Nakae, Anjyou, (JP); and Kyoji Kuroyanagi, Aichiken, (JP).

Signed and Sealed this Eighteenth Day of July 2006.

DERRIS H. BANKS
*Supervisory Patent Examiner*
Art Unit 3725

UNITED STATES PATENT AND TRADEMARK OFFICE
CERTIFICATE OF CORRECTION

PATENT NO. : 6,527,484 B2
APPLICATION NO. : 09/901673
DATED : June 9, 2004
INVENTOR(S) : Kazuyukl Nakamura et al.

It is certified that error appears in the above-identified patent and that said Letters Patent is hereby corrected as shown below:

Title Page, Item (75) Inventors: should read -- Kazuyuki Nakamura, Chiryuu (JP); Yasushi Nogawa, Toyama (JP); Hidetaka Nakae, Anjyou (JP); Katsuhiko Nishimura, Anjyou (JP); Kyoji KUROYANAGI, Aichiken (JP) --

Signed and Sealed this

Thirteenth Day of May, 2008

JON W. DUDAS
*Director of the United States Patent and Trademark Office*